United States Patent
Tipton et al.

(10) Patent No.: US 8,977,454 B2
(45) Date of Patent: Mar. 10, 2015

(54) GRADE-BASED ANTI-HUNT TIMER

(71) Applicant: Caterpillar Inc., Peoria, IL (US)

(72) Inventors: Scott A. Tipton, Peoria, IL (US); James W. Landes, East Peoria, IL (US); Justin L. Steinlage, Mackinaw, IL (US)

(73) Assignee: Caterpillar Inc., Peoria, IL (US)

( * ) Notice: Subject to any disclaimer, the term of this patent is extended or adjusted under 35 U.S.C. 154(b) by 11 days.

(21) Appl. No.: 13/889,097

(22) Filed: May 7, 2013

(65) Prior Publication Data

US 2014/0336889 A1  Nov. 13, 2014

(51) Int. Cl.
*G06F 7/00* (2006.01)
*F16H 61/68* (2006.01)

(52) U.S. Cl.
CPC ...................................... *F16H 61/68* (2013.01)
USPC ................... 701/66; 701/58; 701/61; 701/65; 477/97; 477/120; 477/125

(58) Field of Classification Search
CPC . B60W 10/10; B60W 10/101; B60W 10/103; B60W 10/105; B60W 10/107; B60W 10/108; B60W 10/109; B60W 10/11; B60W 2550/14; B60W 2550/142; B60W 2550/143; B60W 2550/145; B60W 2550/146; B60W 2550/147; B60W 2550/148
See application file for complete search history.

(56) References Cited

U.S. PATENT DOCUMENTS

| | | | |
|---|---|---|---|
| 7,660,657 B2 | 2/2010 | DeMarco et al. | |
| 7,993,243 B2 * | 8/2011 | Silveri et al. | 477/125 |
| 8,568,271 B2 * | 10/2013 | Stoller et al. | 477/42 |
| 8,738,258 B2 * | 5/2014 | Silveri et al. | 701/70 |

\* cited by examiner

*Primary Examiner* — David D Le
(74) *Attorney, Agent, or Firm* — Miller, Matthias & Hull LLP

(57) ABSTRACT

A system and method are provided for grade-based anti-hunt shift control of an automatic transmission powering a machine. A shift controller determines a recommended gear in which to operate the transmission and sets an anti-hunt timer upon recommending a shift from a first gear to a second gear. The anti-hunt timer prevents a subsequent shift back to the first gear while the anti-hunt timer is running. A grade-based controller is configured to track machine operation and to determine when the machine operational factors change such that an estimated steady state gear differs from the second gear. When such a change is encountered, the grade-based controller clears the anti-hunt timer and sets a secondary timer. The clearing of the anti-hunt timer allows a downshift to accommodate the detected grade while the setting of the secondary timer prevents a subsequent clearing of the anti-hunt timer while the secondary timer is running.

20 Claims, 5 Drawing Sheets

GRADE-BASED ANTI-HUNT TIMER

TECHNICAL FIELD OF THE DISCLOSURE

The present disclosure relates to transmission control and, more particularly, relates to a system and method for minimizing transmission gear hunting while allowing necessary gear changes.

BACKGROUND OF THE DISCLOSURE

Because most power sources have a limited range of output RPM, machines employing such power sources will also typically employ a multispeed transmission to provide a greater range of machine speed and acceleration. One type of multispeed transmission is the planetary transmission, but many other transmission types are known. While transmissions having a number of discrete gears are useful in allowing a wider range of operation, such systems generally entail certain disadvantages.

For example, because of the abrupt change of gear ratio at each shift point, any slack or stretch in the power train is allowed to relax or "unwind," causing system sensors to provide readings that will result in a gear change back to the previous gear. This process may then repeat after a change to the previous gear, and so on, resulting in what is referred to as gear "hunting," wherein the transmission executes rapid repeated shifts between adjacent gears. Gear hunting can cause a degraded operator experience, and also often results in unnecessary wear on the entire power train.

In order to prevent hunting and the consequent problems, a number of systems have been devised to preclude rapid shifts between adjacent gears. Of these, one solution has been to provide a shift timer. The shift timer is started at the time that a gear shift occurs, and a transmission controller precludes a subsequent shift until the timer runs out. However, such systems can cause engine lugging or over speeding in the event that a legitimate change of gear ratio is required within the timer duration due to a change in actual machine operating conditions.

To try to prevent lugging, certain solutions have been devised. For example, in U.S. Pat. No. 7,660,657, entitled "Anti-Hunt System and Method for Parallel Path Variable Transmission," a system is disclosed for controlling a split torque transmission having a plurality of contiguous selectable operating ranges, with adjacent operating ranges being separated by synchronous points. After an upshift, the system sets a lock-out timer to prevent a subsequent shift of the transmission until the timer has expired, with the timer being overridden if the transmission output ratio displays certain trends.

While the '657 system effectively prevents high-frequency hunting based on trend tracking, the existence of drive train ringing or unwinding may in some cases hide a transmission output ratio trend. It may also be desirable to further limit the override of the lockout timer in some way to prevent lower frequency shift oscillations.

The present disclosure is directed to a system that may exhibit numerous distinctions over prior systems. However, it should be appreciated that any such distinction is not a limitation on the scope of the disclosed principles or of the attached claims except to the extent expressly noted. Additionally, the discussion of any problem or solution in this Background section is not an indication that the problem or solution represents known prior art except as otherwise noted by the inclusion of a patent number. In the case of the identified patent, the foregoing is intended as a brief summary, not as a construction of the patent in question or its claims, and the reader is referred to the patent itself in the event that a full and accurate understanding is desired.

SUMMARY OF THE DISCLOSURE

In accordance with one aspect of the present disclosure, a system is provided for grade-based anti-hunt shift control of a transmission powering a machine. The transmission is an automatic transmission having a number of discrete gears corresponding to different transmission ratios. A shift controller determines a recommended gear in which to operate the transmission and sets an anti-hunt timer upon recommending a shift from a first gear to a second gear, such that the anti-hunt timer prevents a subsequent shift back to the first gear while the anti-hunt timer is running. In cooperation, a grade-based controller employs an estimated payload and measured grade to calculate an estimated steady state gear. When the grade-based controller determines that the estimated steady state gear differs from the current gear, i.e., the machine has encountered a significant actual grade or load change, the grade-based controller clears the anti-hunt timer, and sets a secondary timer to prevent subsequent clearing of the anti-hunt timer until the secondary timer expires.

In accordance with another aspect of the present disclosure, a machine having anti-hunt shift control is provided. The machine includes a transmission powering the machine. The transmission is an automatic transmission with a number of discrete gears representing distinct transmission input/output ratios. An anti-hunt timer having a primary duration prevents a shift of the transmission when the anti-hunt timer is running, and a secondary timer prevents clearing of the anti-hunt timer when the secondary timer is running. A first controller requests a shift of the transmission, the first controller being further configured to set the anti-hunt timer upon requesting a shift, while a second controller determines a desirable steady state gear in which to operate the transmission, and determines whether the current gear differs from the estimated steady state gear. The second controller is further configured to clear the anti-hunt timer and set the secondary timer if the current gear differs from the desirable steady state gear.

In accordance with yet another aspect of the present disclosure, a method for controlling an automatic machine transmission is provided. The automatic machine transmission supports a plurality of discrete gears corresponding to respective distinct input/output ratios. The machine further including an anti-hunt timer to preclude a subsequent gear shift of the transmission after an initial gear shift for a duration of the anti-hunt timer, while a secondary timer prevents clearing of the anti-hunt timer for a duration of the secondary timer. After shifting the automatic machine transmission from the initial gear to a second gear and setting the anti-hunt timer, it is detected that a persistent change of machine operating conditions has occurred such that the second gear is less desirable than the initial gear. The anti-hunt timer is cleared to allow a shift from the second gear to the initial gear and the secondary timer is set.

Other features and advantages of the disclosed systems and principles will become apparent from reading the following detailed disclosure in conjunction with the included drawing figures.

DETAILED DESCRIPTION OF THE DISCLOSURE

The present disclosure provides a system and method for grade-based anti-hunt shift control of an automatic transmission powering a machine. The automatic transmission receives power from a machine power source, e.g., an engine, and provides power to a machine drive train, e.g., to drive one or more wheels, tracks, or other ground engaging mechanism. A shift controller determines a recommended gear in which to operate the transmission and sets an anti-hunt timer upon recommending a shift from a first gear to a second gear. The anti-hunt timer prevents a subsequent shift back to the first gear while the anti-hunt timer is running. A grade-based controller is configured to track machine operation and to determine when the machine encounters a change in machine operational conditions (e.g., load and/or grade) that would present a need for a gear shift during the pendency of the anti-hunt timer. When such a change is encountered, the grade-based controller then clears the anti-hunt timer and sets a secondary timer. The clearing of the anti-hunt timer allows a downshift to accommodate the detected change in conditions, while the setting of the secondary timer prevents a subsequent clearing of the anti-hunt timer while the secondary timer is running.

Figure 1:
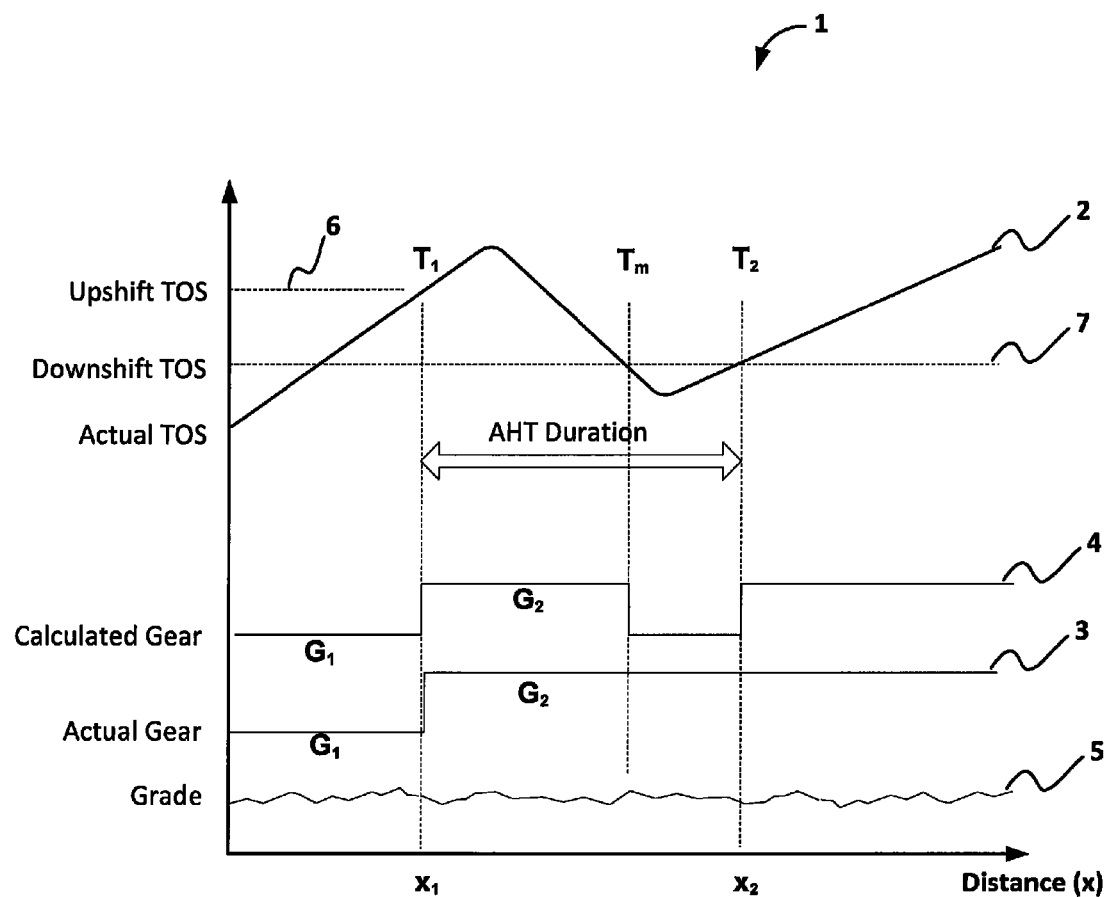
FIG. 1 is a simplified machine data plot illustrating the manner in which an anti-hunt timer may inhibit downshifting when encountering a temporary loss of transmission output speed.

Having discussed various embodiments in overview, we turn now to detailed descriptions of certain embodiments. FIG. 1 is a simplified machine data graph illustrating the manner in which an anti-hunt timer may inhibit downshifting when encountering a temporary loss of transmission output speed (TOS). While the TOS is used to measure speed in this example, it will be appreciated that other parameters may instead be used in this role, e.g., wheel speed, radar based machine speed, etc. The graph 1 illustrates certain parameters and values as a function of location, and includes a transmission output speed (TOS) plot 2, an actual gear plot 3, a nominal or calculated gear plot 4, and a terrain grade plot 5 representing the terrain level at each distance along the horizontal axis.

In addition to the aforementioned parameters, the graph 1 also includes an upshift TOS level 6 and a downshift TOS level 7. The upshift TOS level 6 represents the TOS at which the calculated (nominal) transmission gear changes from a current gear to a higher gear. Although a single upshift TOS level 6 is shown, it will be appreciated that the TOS upshift level will be gear-dependent, e.g., with lower gears having lower upshift levels. Similarly, the downshift TOS level 7 represents the TOS at which the calculated transmission gear changes from a current gear to a lower gear, and it will be appreciated that the precise level is gear-dependent.

As noted above, the machine data graph 1 of FIG. 1 illustrates the way in which an anti-hunt timer can properly inhibit downshifting when encountering a temporary loss of transmission output speed, such as during power train unwinding and oscillation. In particular, as can be seen, as the machine's actual TOS 2 increases in a first gear $G_1$, the TOS passes the upshift TOS level 6 at time $T_1$ ($x(t)=x_1$). At this point, the calculated gear 4 changes from $G_1$ to $G_2$, and the actual gear shifts from $G_1$ to $G_2$. The anti-hunt timer (AHT) is also set at time $T_1$.

However, as the transmission unwinds, the actual TOS 2 drops momentarily, passing briefly below the downshift TOS level 7 at an intermediate time $T_m$. Because the TOS 2 has fallen below the downshift TOS level 7, the calculated gear reverts to $G_1$. However, because the AHT has not yet expired at time $T_m$, the actual gear 3 remains at gear $G_2$; by the time the AHT expires at time $T_2$, the actual TOS 2 has risen above the downshift TOS level 7 and the actual gear 3 remains at $G_2$. If the actual TOS 2 were to again drop below the downshift TOS level 7 after the AHT has expired, a downshift would ordinarily be executed.

Figure 2:
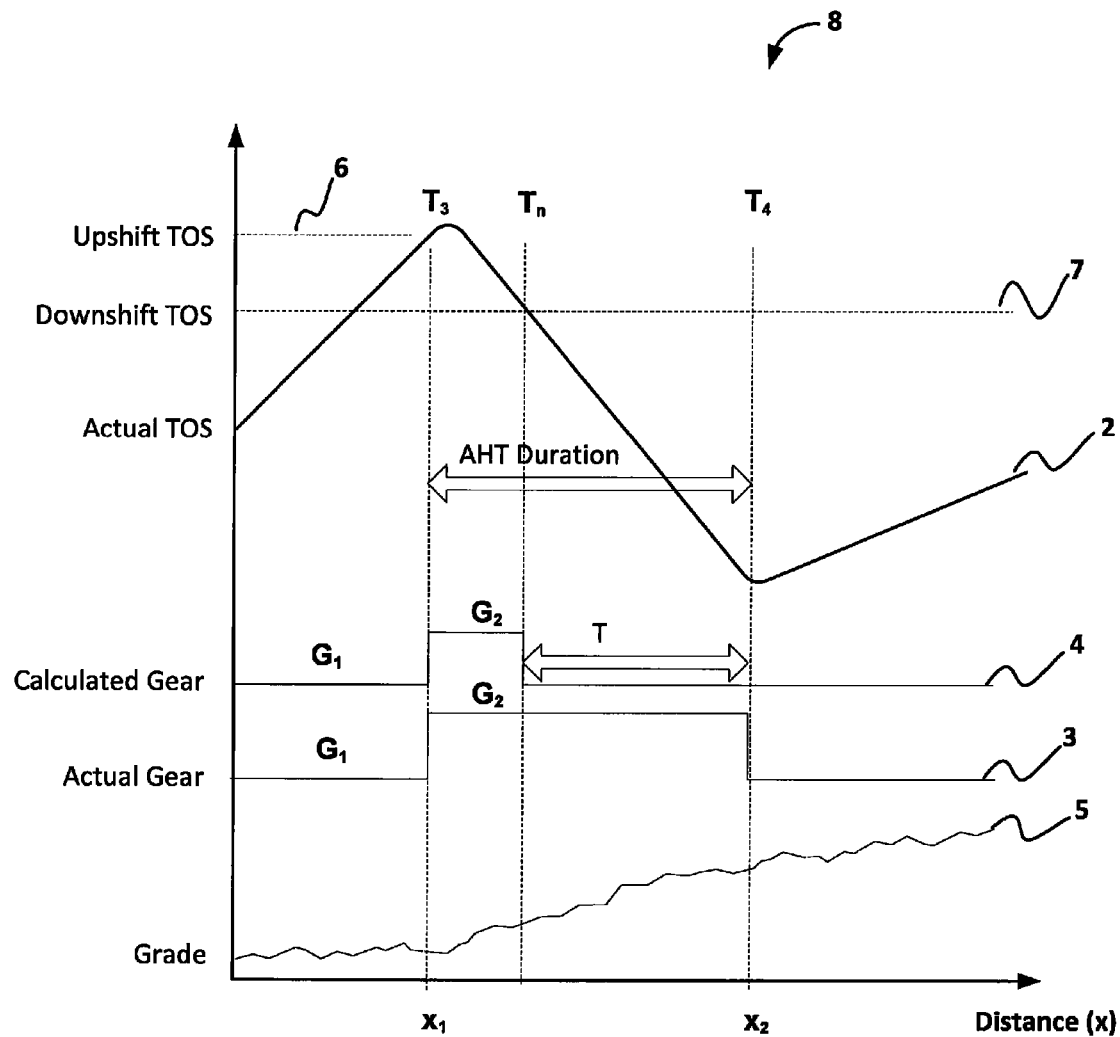
FIG. 2 is a simplified machine data plot illustrating the manner in which an anti-hunt timer may inhibit downshifting when encountering a grade-induced persistent loss of transmission output speed.

Although an ordinary AHT system functions well in the TOS sequence shown in FIG. 1, there are situations wherein the AHT improperly prevents a downshift. In the example graph 8 shown in FIG. 2, the transmission is initially in the current gear $G_1$ and is accelerating. At time $T_3$, the actual TOS 2 passes the level defined by the upshift TOS 6, at which time the calculated gear 4 transitions from $G_1$ to $G_2$, and the actual gear 3 transitions as well, and the AHT is started.

However, shortly after the shift from $G_1$ to $G_2$, the machine encounters a change in grade as can be seen from the terrain grade plot 5. As a result of the change in grade, the actual TOS 2 begins to drop, and at time $T_n$ the TOS 2 drops below the downshift TOS level 7. Thus at time $T_n$, the calculated gear 4 reverts from $G_2$ to $G_1$. However, since the AHT has not expired at time $T_n$, the actual gear 3 remains at $G_2$. As a result, the actual TOS 2 drops far out of the ideal range for gear $G_2$, causing engine lugging and loss of performance and efficiency.

In the following, a system having a number of controllers is discussed. It will be appreciated that a physical controller is a computing device for accepting data and/or command inputs, executing a control algorithm, and providing control outputs to control an entity or process. Similarly, a logical controller is a function or the associated range of programming code that performs a function normally associated with a physical controller. It will be appreciated that the discussed separate logical controllers may be associated with separate physical controllers or may be combined in a fewer number of physical controllers, even a single physical controller. Moreover, while the function of the various logical controllers and logical timers are separated for ease of understanding herein, it should be appreciated that the various separate logical entities may also be implemented as a fewer number of more complex logical entities.

In an embodiment of the disclosure, a process of shift control is provided wherein anti-hunt timing is provided, while allowing needed downshifts when terrain or load conditions require a shift to maintain optimum performance and efficiency. In particular, an AHT is employed to preclude rapid sequential shifting due to transient drive train conditions, while a grade-based override is provided in conjunction with a secondary shift timer. It will be appreciated that the term "grade-based controller" is used herein to denote a controller that considers grade in determining an estimated steady state gear as described, but that at any given moment during operation a change in the estimated steady state gear may be caused by a change in an operational condition or factor other than grade.

Figure 3:
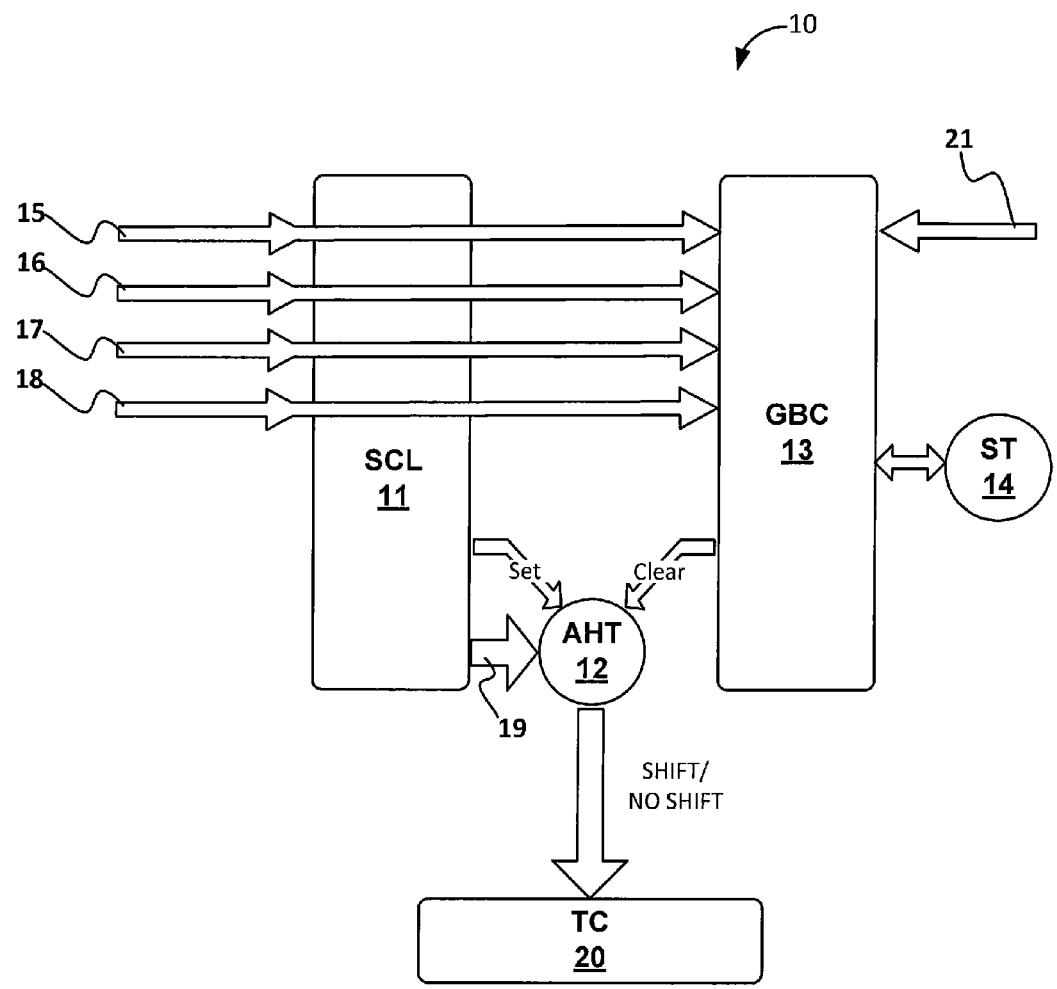
FIG. 3 is a logical system diagram showing system inputs and outputs related to grade-based anti-hunt shift control.

Referring now to FIG. 3, a logical system diagram 10 illustrates system operation units, inputs and outputs related to grade-based anti-hunt shift control. The system includes a logical shift controller 11, a logical anti-hunt timer 12, a logical grade-based controller 13 and a logical secondary timer 14. The logical shift controller 11 receives a number of machine inputs including a TOS input 15 indicative of the machine TOS, a load input 16 indicative of a load carried by the machine, an engine speed input 17, and a shift indication input 18.

In operation, the logical shift controller 11 calculates or generates an indication of an appropriate or desired gear based on the status of the machine in question. For example, the logical shift controller 11 may map combinations of engine speed range, transmission output speed range and machine load to desired gears. Within this example, assume that a machine with a relatively light load is to operate at lower engine speeds in general since the torque needed to overcome inertia and account for rolling resistance may be lower. As such, the range of transmission output speeds mapped to a particular gear may correspond to a lower range of engine speed than would be the case for a more highly loaded machine.

In keeping with the calculation or generation of a desired gear, the logical shift controller 11 provides a gear recommendation output 19. In addition, based on the shift indication input 18, the logical shift controller 11 sets the anti-hunt timer 12 each time an upshift indication is received. The duration of the anti-hunt timer, herein referred to as a primary duration, may be user-settable or may be configured prior to delivery of the machine.

The gear recommendation output is essentially blocked or passed based on the anti-hunt timer 12. In particular, if the anti-hunt timer 12 is running (active and not yet expired), the gear recommendation of the gear recommendation output 19 is not passed to the transmission controller 20. Conversely, if the anti-hunt timer 12 is not running (expired or not active), then the gear recommendation of the gear recommendation output 19 is passed to the transmission controller 20.

However, the logical grade-based controller 13 may override the anti-hunt timer in certain circumstances, for example, to allow a downshift when a persistent change in load and/or terrain is encountered. The logical grade-based controller 13 operates in cooperation with a logical secondary timer 14 distinct from the anti-hunt timer 12. In an embodiment, the logical grade-based controller 13 does not command a shift, but rather forces the anti-hunt timer 12 to allow a shift if one is recommended by the logical shift controller 11. In addition, as can be seen in FIG. 3, the logical grade-based controller 13 receives the TOS input 15 indicative of the machine TOS, the load input 16 indicative of the load carried by the machine, the engine speed input 17, and the shift indication input 18, as well as a grade input 21 indicative of a current terrain grade at the machine's location.

In operation, the logical grade-based controller 13 provides a feed-forward behavior that identifies that the grade and/or payload conditions associated with the machine have changed sufficiently since the initiation of a shift that any loss of TOS immediately thereafter is due to such changes rather than to transient phenomena. In particular, the logical grade-based controller 13 calculates an estimated steady state gear based on the grade and payload conditions. If the estimated steady state gear is lower than the current gear, then the logical grade-based controller 13 clears the anti-hunt timer 12 to allow a downshift if one is recommended by the logical shift controller 11.

The calculation of the estimated steady state gear may be executed in any suitable fashion, with the goal of providing a gear that places the engine in its effective or fuel efficient range of output speed while allowing sufficient transmission output torque for continued motion and acceptable acceleration. In an embodiment, the steady state gear is calculated by deriving a drive train load based on machine weight, load and level rolling resistance, as well as machine grade.

However the estimated steady state gear is calculated, once a downshift is actually executed after the clearing of the anti-hunt timer, it is still possible for the drive train to oscillate or ring subsequent to the allowed shift, requiring the intervention of the anti-hunt timer 12. Thus, in an embodiment, the logical grade-based controller 13 sets the logical secondary timer 14 when it clears the anti-hunt timer 12. The logical grade-based controller 13 will then not clear the anti-hunt timer 12 again until the expiration of the logical secondary timer 14. In an embodiment, the anti-hunt timer 12 has a primary duration (e.g., 1-3 seconds) that is shorter than a secondary duration (e.g., 10 seconds) associated with the logical secondary timer 14. In this way, the logical grade-based controller 13 will not be able to repeatedly clear the anti-hunt timer 12 in rapid succession, as such may prevent setting of the anti-hunt timer 12 when it would otherwise be set to prevent anomalous gear selection due to driveline dynamics.

It will be appreciated that in an embodiment, the logical grade-based controller 13 does not explicitly command a downshift. Rather, the logical grade-based controller 13 simply allows the logical shift controller 11 to successfully request a downshift prior to the anti-hunt timer 12 expiring.

Figure 4:
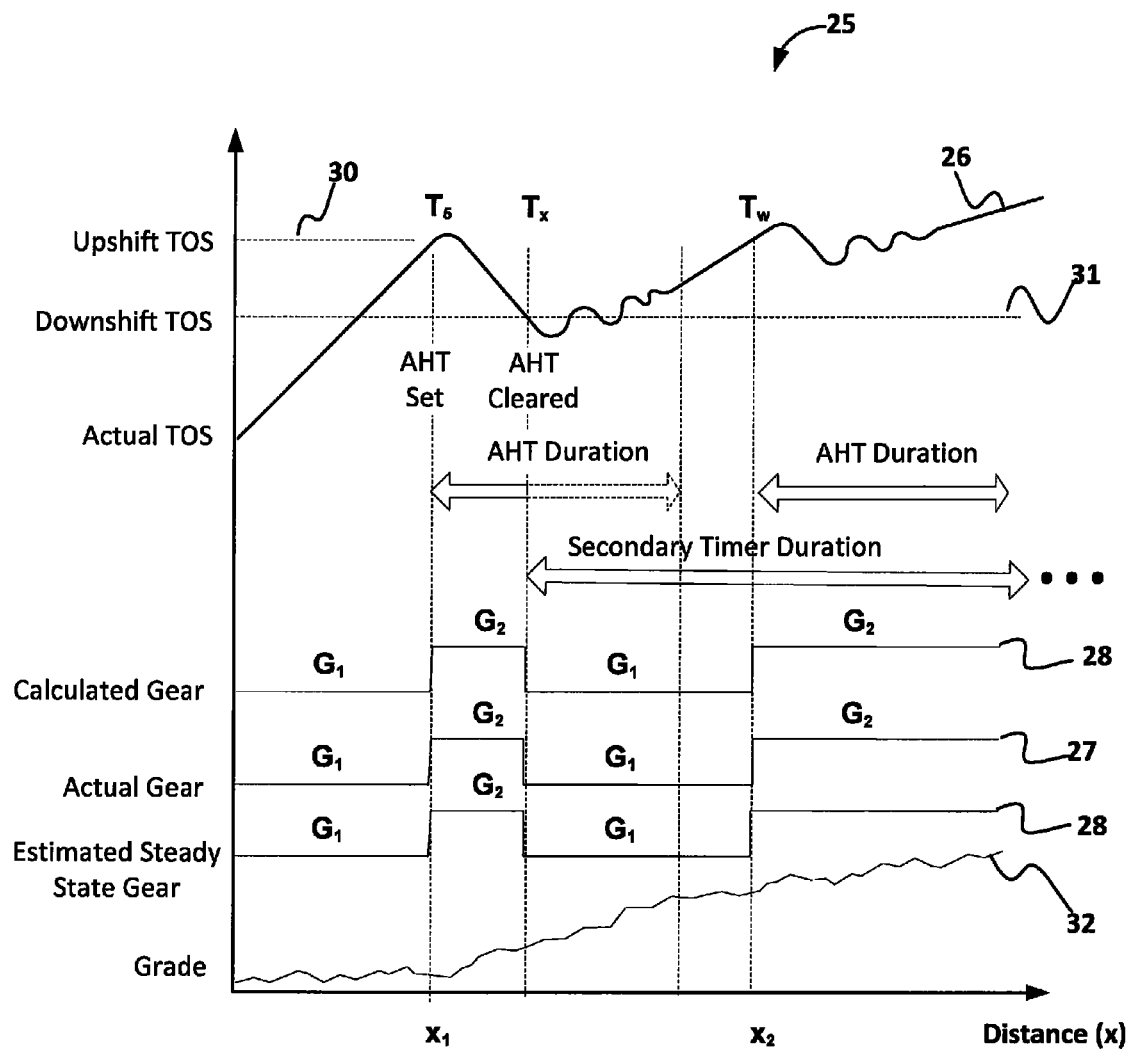
FIG. 4 is a plot of machine data wherein grade-based control is used to override an anti-hunt timer to allow downshifting during a grade-induced persistent loss of transmission output speed.

An example of machine behavior in keeping with the disclosure is shown in FIG. 4. In particular, FIG. 4 is a simplified machine data graph 25 illustrating the manner in which the logical grade-based controller 13 controls the anti-hunt timer 12 to inhibit downshifting due to transient driveline phenomena while allowing downshifting due to a change in machine status, such as when the machine encounters a persistent grade change. The graph 25 illustrates machine and terrain parameters as a function of location, including a TOS plot 26, an actual gear plot 27, a calculated gear plot 28, and a terrain grade plot 29 representing the terrain level at each distance along the horizontal axis. An estimated steady state gear plot 32 is also shown.

The graph 25 further includes an upshift TOS level 30 and a downshift TOS level 31. The upshift TOS level 30 represents the TOS at which the calculated transmission gear changes from a current gear to a higher gear. As noted above, the upshift TOS level 30 may be gear-dependent. Similarly, the downshift TOS level 31 represents the TOS at which the calculated transmission gear changes from a current gear to a lower gear, and it will be appreciated that the precise level is similarly gear-dependent.

At the outset of the graph 25, the machine is travelling on relatively level terrain as seen in the terrain grade plot 29 and is accelerating in gear $G_1$, as seen in the TOS plot 26 and the actual gear plot 27 respectively. As the machine progresses, the TOS reaches the upshift TOS level 30, as seen in the TOS plot 26, at time $T_5$ and position $x_1$. In this regard, the machine behavior is similar to that shown in FIG. 2.

As the TOS plot 26 crosses the upshift TOS level 30, the logical shift controller 11 recalculates the recommended gear and changes its gear recommendation output 19 to indicate a higher gear, i.e., gear $G_2$. This can be seen in the calculated gear plot 28 as it shifts from $G_1$ to $G_2$ at time $T_5$. In response, since the anti-hunt timer 12 is not currently active, the change in gear recommendation is passed to the transmission controller 20, and the actual transmission gear also changes from gear $G_1$ to gear $G_2$ as seen in the actual gear plot 27. In this regard, the estimated steady state gear plot 32 matches the actual gear plot 27.

At the same time as, or generously contemporaneously with, the change in actual gear, the logical shift controller 11 sets the anti-hunt timer 12. As noted above, the anti-hunt timer 12 may have a duration that is generally long enough to avoid shifting during transmission unwinding or ringing, e.g., a duration from about one second to about three seconds.

However, also at approximately time $T_5$, the terrain changes as well, and in particular, a persistent grade increase is encountered starting at about time $T_5$ as seen in the terrain grade plot 29. As a result of the grade change, the TOS plot 26 begins to drop precipitously after time $T_5$ to a much greater extent than would be expected on level terrain. As the TOS drops, as reflected in the TOS plot 26, the TOS plot 26 quickly crosses the downshift TOS level 31 at about time $T_x$, where the difference $T_x-T_5$ is less than the duration of the anti-hunt timer 12, such that the anti-hunt timer 12 is still active at time $T_x$.

At this point, the logical shift controller 11 recalculates the recommended gear to be $G_1$, and provides a corresponding recommendation at gear recommendation output 19 at time $T_x$. Normally, the anti-hunt timer 12 being active at this time would prevent the shift recommendation from being passed to the transmission controller 20. However, at time $T_5$, the grade-based controller 13 received an indication of the change in grade via the grade input 21. While the terrain upon which the machine travels may contain a great many transient grade changes, as evidenced by the slight roughness in the terrain grade plot 29, the grade change sensed starting at time $T_5$ is determined by the grade-based controller 13 to be a persistent rather than transient change. As such, the grade-based controller 13, which maintains a running indication of an estimated steady state gear, changes the estimated steady state gear from $G_2$ back to $G_1$.

When the grade-based controller 13 changes the estimated steady state gear from $G_2$ back to $G_1$ after time $T_5$, the grade-based controller 13 clears the anti-hunt timer 12 at about time $T_x$. At approximately the same time, allowing for computational delays and other unintentional delays, the grade-based controller 13 also sets the secondary timer 14. As noted above, while the secondary timer 14 is active, the grade-based controller 13 may not again clear the anti-hunt timer 12. In this way, anti-hunt protection generally remains available after an override of the anti-hunt timer 12 by the grade-based controller 13.

INDUSTRIAL APPLICABILITY

In general terms, the present disclosure sets forth a system and method for providing an anti-hunt functionality for an automatic transmission having discrete gears to provide different ranges of output speed and/or torque. Aspects of the disclosure may be utilized in systems having any of various types of power production and/or drive technology, including but not limited to electric, gas, diesel, propane, electro-hydraulic, and so on. While it is anticipated that the disclosure may provide the greatest benefit with respect to industrial or earth-working machines that carry or include a large load, e.g., dump trucks, it will be appreciated that the techniques described herein are of much wider applicability.

The described system operates by providing grade-based anti-hunt timer control. In particular, while the anti-hunt timer protects against hunting due to transient drive line dynamics when shifting gears, a grade-based controller is configured to clear the anti-hunt timer if a persistent change in grade and/or in load results in a change in estimated steady state gear. The grade-based controller is associated with a secondary timer that disallows subsequent clearing of the anti-hunt timer for a predetermined period or duration. The resultant system provides protection against hunting while allowing a rapid follow-up shift when needed due to a change in circumstance while the anti-hunt timer is still active.

Figure 5:
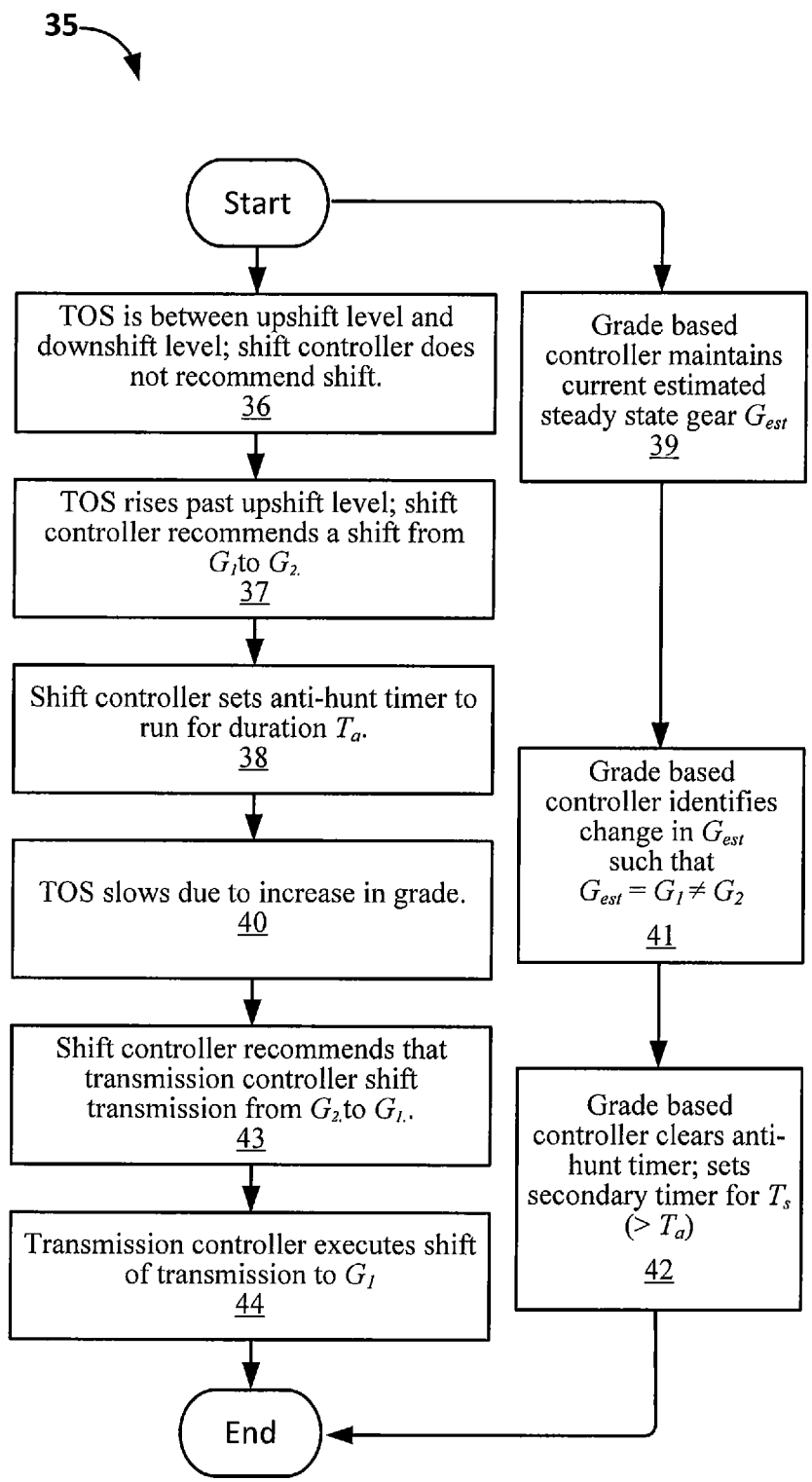
FIG. 5 is a flow chart illustrating a process of providing grade-based anti-hunt shift control.

In the foregoing description referring to FIGS. 1-4, various components and operations of the disclosed system are discussed. In FIG. 5, discussed below, a method of operation of the disclosed system is illustrated. It will be appreciated that although various actions are assigned in this example to various components, the entire control system may be, but need not be, implemented using fewer components or indeed including all components in a single controller. While timers are illustrated as separate entities, it will be appreciated that any of the controllers may run one or more timers internally.

Further, it will be appreciated that that the execution of actions or steps by computing entities such as logical or physical controllers is implemented through the reading of computer-executable instructions from a non-transitory computer readable media. Suitable non-transitory computer readable media include any collection of one or more non-transitory memory devices such as hard drives, flash drives, RAM, ROM, magnetic drives, optical drives, and so on.

Referring now to FIG. 5, the illustrated flow chart shows a process 35 for executing anti-hunt shift control in an automatic transmission having a plurality of discrete gears corresponding to discrete transmission ratios, i.e., the ratio between the transmission output speed and the transmission input speed.

The initial conditions of the system for the given example assume that a machine being driven by the transmission is accelerating in a gear $G_1$ having a lower gear ratio than a gear $G_2$. From the range in which the automatic transmission is operating, the automatic transmission is set to upshift when the transmission output speed reaches a predetermined upshift level and to downshift when the transmission output speed drops below a predetermined downshift level, where the predetermined upshift level is higher than the predetermined downshift level.

For the sake of the given example, transmission control functions are divided among a transmission controller directly interfacing with the transmission, a shift controller interfacing with the transmission controller via an anti-hunt timer, and a grade-based controller interfacing with the anti-hunt timer and a secondary timer.

At a first stage 36 of the process 35, the shift controller determines that the transmission output speed is between the predetermined upshift level and the predetermined downshift level. As such, the shift controller does not recommend a shift into either a higher or lower gear. Subsequently at stage 37 of the process 35, the shift controller determines that the transmission output speed has risen past the predetermined upshift level and recommends a shift to the higher gear $G_2$ from the current gear $G_1$. At essentially the same time, in stage 38 of the process 35, the shift controller sets the anti-hunt timer to run for a predetermined duration $T_a$, ostensibly precluding a subsequent downshift until the predetermined duration $T_a$ expires.

In parallel with stages 36-38, the grade-based controller has maintained, in stage 39, a current estimated steady state gear $G_{est}$ based on current grade and machine load (potentially in combination with other factors such as known rolling resistance and so on). At stage 40 of the process 35, the transmission output speed begins to slow due to an increase in grade. In parallel, the grade-based controller determines at stage 41 that the estimated steady state gear $G_{est}$ is now $G_1$ which is different than the current gear $G_2$. Thus at stage 42, the grade-based controller clears the anti-hunt timer and sets the secondary timer for a predetermined duration $T_s$ (longer than the predetermined anti-hunt duration $T_a$) to prevent the grade-based controller from subsequently re-clearing the anti-hunt timer until the secondary timer expires.

At stage 43, the transmission output speed drops below the predetermined downshift level and the shift controller issues a recommendation that the transmission controller shift the transmission from current gear $G_2$ to lower gear $G_1$. Because the anti-hunt timer has been cleared by the grade-based controller, the transmission controller executes the recommendation in stage 44 and shifts the transmission to gear $G_1$. As a result, the transmission output speed again increases, preventing engine lugging or stalling, and maintaining the engine speed in an efficient range.

It will be appreciated that the present disclosure provides a new and useful transmission system for use in a variety of machines. While only certain embodiments have been set forth, alternatives and modifications will be apparent from the above description to those skilled in the art. These and other alternatives are considered equivalents and within the spirit and scope of this disclosure and the appended claims.

What is claimed is:

1. A system for grade-based anti-hunt shift control for controlling a transmission powering a machine, the transmission being an automatic transmission having a plurality of discrete gears, each gear corresponding to a distinct transmission ratio, the system comprising:
   a shift controller configured to determine a recommended gear in which to operate the transmission;
   an anti-hunt timer having a primary duration, wherein the shift controller is further configured to set the anti-hunt timer upon recommending a shift from a first gear to a second gear adjacent the first gear, wherein the anti-hunt timer prevents a subsequent shift from the second gear back to the first gear while the anti-hunt timer is running;
   a grade-based controller configured to calculate an estimated steady state gear based on at least one of current grade and machine load and to clear the anti-hunt timer when the estimated steady state gear differs from the second gear;
   a secondary timer having a secondary duration, wherein the grade-based controller is further configured to set the secondary timer upon clearing the anti-hunt timer and is disabled from again clearing the anti-hunt timer until the secondary timer expires.

2. The system for grade-based anti-hunt shift control in accordance with claim 1, wherein the grade-based controller is configured to calculate the estimated steady state gear further based on an estimated rolling resistance of the machine.

3. The system for grade-based anti-hunt shift control in accordance with claim 1, wherein the estimated steady state gear that differs from the second gear is the first gear.

4. The system for grade-based anti-hunt shift control in accordance with claim 1, wherein the first gear is lower than the second gear.

5. The system for grade-based anti-hunt shift control in accordance with claim 1, wherein the second gear is lower than the first gear.

6. The system for grade-based anti-hunt shift control in accordance with claim 1, wherein the secondary duration is longer than the primary duration.

7. The system for grade-based anti-hunt shift control in accordance with claim 1, wherein the primary duration is from about one second to about three seconds.

8. The system for grade-based anti-hunt shift control in accordance with claim 1, wherein the secondary duration is from about three seconds to about 10 seconds.

9. A machine having anti-hunt shift control, the machine comprising:
   a transmission powering the machine, the transmission being an automatic transmission having a plurality of discrete gears corresponding to respective distinct transmission input/output ratios, and being in a current gear during operation;
   an anti-hunt timer having a primary duration and being configured to prevent a shift of the transmission when the anti-hunt timer is running;
   a secondary timer having a secondary duration and being configured to prevent clearing of the anti-hunt timer when the secondary timer is running;
   a first controller configured to request a shift of the transmission, the first controller being further configured to set the anti-hunt timer upon requesting a shift from a first gear to a second gear adjacent the first gear; and
   a second controller configured to determine an estimated steady state gear in which to operate the transmission, and to determine whether the current gear differs from the estimated steady state gear, the second controller being further configured to clear the anti-hunt timer and set the secondary timer if the current gear differs from the estimated steady state gear.

10. The machine having anti-hunt shift control in accordance with claim 9, wherein the second controller is further configured to determine the estimated steady state gear based at least in part on an estimated rolling resistance of the machine.

11. The machine having anti-hunt shift control in accordance with claim 10, wherein the second controller is further configured to receive an indication of a load carried by the machine and to determine the estimated steady state gear based at least in part on the load carried by the machine.

12. The machine having anti-hunt shift control in accordance with claim 10, wherein the second controller is further configured to determine a terrain grade, and to determine the estimated steady state gear based at least in part on the terrain grade.

13. The machine having anti-hunt shift control in accordance with claim 10, wherein the first gear is lower than the second gear.

14. The machine having anti-hunt shift control in accordance with claim 10, wherein the second gear is lower than the first gear.

15. The machine having anti-hunt shift control in accordance with claim 10, wherein the primary duration is from about one second to about three seconds.

16. The machine having anti-hunt shift control in accordance with claim 10, wherein the secondary duration is from about three seconds to about 10 seconds.

17. A method for controlling an automatic machine transmission of a machine, the automatic machine transmission being configured to receive power from a machine power source and to provide power to a machine drive train, the automatic machine transmission having a plurality of discrete gears, each gear corresponding to a respective distinct input/output ratio of the automatic machine transmission, and being in a current gear during operation, the machine further including an anti-hunt timer to preclude a subsequent gear shift after an initial gear shift for a duration of the anti-hunt timer, and a secondary timer configured to prevent clearing of the anti-hunt timer for a duration of the secondary timer, the method comprising:

receiving are request to shift the automatic machine transmission from a first gear to a second gear adjacent to the first gear;

setting the anti-hunt timer upon receiving the request to shift the automatic transmission from the first gear to the second gear adjacent to the first gear;

determining an estimated steady state gear in which to operate the transmission;

determining if the current gear differs from the estimated steady state gear;

clearing the anti-hunt timer to allow a shift from the second gear to the first gear if the current gear differs from the estimated steady state gear; and setting the secondary timer if the current gear differs from the estimated steady state gear.

18. The method for controlling an automatic machine transmission in accordance with claim 17, wherein the first gear is lower than the second gear.

19. The method for controlling an automatic machine transmission in accordance with claim 17, wherein the second gear is lower than the first gear.

20. The method for controlling an automatic machine transmission in accordance with claim 17, wherein the duration of the anti-hunt timer is shorter than the duration of the secondary timer.

* * * * *